(12) United States Patent
Kim et al.

(10) Patent No.: US 12,286,490 B2
(45) Date of Patent: Apr. 29, 2025

(54) POLYMER PRODUCTION METHOD

(71) Applicant: LG CHEM, LTD., Seoul (KR)

(72) Inventors: In Soo Kim, Daejeon (KR); Hyung Sub Lee, Daejeon (KR); Dae Woo Lee, Daejeon (KR); Min Cheol Ju, Daejeon (KR); Min Seung Shin, Daejeon (KR); Sung Won Hong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 575 days.

(21) Appl. No.: 17/783,184

(22) PCT Filed: Oct. 18, 2021

(86) PCT No.: PCT/KR2021/014511
§ 371 (c)(1),
(2) Date: Jun. 7, 2022

(87) PCT Pub. No.: WO2022/097962
PCT Pub. Date: May 12, 2022

(65) Prior Publication Data
US 2023/0039916 A1    Feb. 9, 2023

(30) Foreign Application Priority Data

Nov. 5, 2020    (KR) .................. 10-2020-0146933
Oct. 13, 2021   (KR) .................. 10-2021-0135820

(51) Int. Cl.
```
C08F 2/18       (2006.01)
C08F 212/08     (2006.01)
C08F 212/10     (2006.01)
C08F 220/44     (2006.01)
C08F 222/40     (2006.01)
C08F 220/40     (2006.01)
```

(52) U.S. Cl.
CPC .............. *C08F 2/18* (2013.01); *C08F 212/08* (2013.01); *C08F 220/44* (2013.01); *C08F 222/402* (2020.02); *C08F 212/10* (2013.01); *C08F 220/40* (2013.01); *C08F 2800/20* (2013.01)

(58) Field of Classification Search
None
See application file for complete search history.

(56) References Cited

U.S. PATENT DOCUMENTS

| | | | |
|---|---|---|---|
| 4,381,373 A | 4/1983 | Ikuma | |
| 4,916,196 A * | 4/1990 | Aoki | C08F 212/04 526/342 |
| 2010/0036065 A1 | 2/2010 | Sohn et al. | |
| 2010/0240851 A1 | 9/2010 | Sohn et al. | |
| 2010/0324231 A1 | 12/2010 | Yamashita et al. | |
| 2012/0142875 A1 | 6/2012 | Sohn et al. | |
| 2015/0376316 A1 | 12/2015 | Heo et al. | |
| 2020/0369813 A1 | 11/2020 | Matsumoto et al. | |
| 2021/0054124 A1 | 2/2021 | Ju et al. | |
| 2021/0403621 A1 | 12/2021 | Kim et al. | |

FOREIGN PATENT DOCUMENTS

| | | |
|---|---|---|
| CN | 101081886 A | 12/2007 |
| CN | 101139424 A | 3/2008 |
| CN | 101511885 A | 8/2009 |
| CN | 101538347 A | 9/2009 |
| CN | 104356272 A | 2/2015 |
| CN | 111087547 A | 5/2020 |
| CN | 111868118 A | 10/2020 |
| JP | S60147414 A | 8/1985 |
| JP | S63162708 A | 7/1988 |
| JP | S63304042 A | 12/1988 |
| JP | H05155906 A | 6/1993 |
| JP | H06248017 A | 9/1994 |
| JP | H07113019 A | 5/1995 |
| JP | H09221522 A | 8/1997 |
| JP | H10-330565 A | 12/1998 |
| JP | 2009-191096 A | 8/2009 |
| KR | 87-0005016 A | 6/1987 |
| KR | 89-3538 B1 | 9/1989 |
| KR | 10-1995-0006130 B1 | 6/1995 |
| KR | 10-0154910 B1 | 12/1998 |
| KR | 10-0360947 B1 | 1/2003 |
| KR | 10-2008-0110416 A | 12/2008 |
| KR | 20100062418 A | 6/2010 |
| KR | 10-2011-0063947 A | 6/2011 |
| KR | 10-2015-0066386 A | 6/2015 |

(Continued)

OTHER PUBLICATIONS

Yang, L. et al., "Synthesis and Thermoanalysis of Emulsion Terpolymers of N-Phenylmaleimide, Styrene, and Acrylonitrile". Journal of Applied Polymer Science 2001, 79(6), 959-1149. (Year: 2001).*

(Continued)

*Primary Examiner* — Richard A. Huhn
(74) *Attorney, Agent, or Firm* — Morgan, Lewis & Bockius LLP

(57) ABSTRACT

Provided is a polymer production method including: batch-adding a reaction solution including a monomer mixture including a maleimide-based monomer, a vinyl aromatic monomer, and a vinyl cyanide-based monomer and an aqueous solvent to a reactor and initiating polymerization; and carrying out the polymerization while continuously adding the maleimide-based monomer and the aqueous solvent to the reactor, wherein the reaction solution satisfies the above Formula 1.

10 Claims, No Drawings

(56) References Cited

FOREIGN PATENT DOCUMENTS

| KR | 20150066386 A | * | 6/2015 |
| KR | 10-2019-0134452 A | | 12/2019 |
| KR | 10-2020-0103640 A | | 9/2020 |

OTHER PUBLICATIONS

Miyata, T. et al., "Rate of Suspension Copolymerization of Styrene and Acrylonitrile". J-Stage Chemical engineering, 1973, 37(6), 607-614,a1. (Year: 1973).*

Office Action issued in corresponding Chinese Patent Application No. 202180007047.9, dated May 10, 2023.

Extended European Search Report issued in corresponding European Patent Application No. 21889427.7.

International Search Report (with partial translation) and Written Opinion dated Jan. 24, 2022, for corresponding International Patent Application No. PCT/KR2021/014511.

\* cited by examiner

POLYMER PRODUCTION METHOD

CROSS-REFERENCE TO RELATED APPLICATION

This application claims priority to and the benefit of Korean Patent Application No. 10-2020-0146933, filed on Nov. 5, 2020, and Korean Patent Application No. 10-2021-0135820, filed on Oct. 13, 2021, the disclosures of which are incorporated herein by reference in their entirety.

TECHNICAL FIELD

The present invention relates to a polymer production method, and more particularly, to a polymer production method capable of producing a polymer having a uniform composition and excellent heat resistance throughout polymerization.

BACKGROUND ART

In order to increase the heat resistance of a polymer including a vinyl cyanide-based monomer unit and a vinyl aromatic monomer unit, an alkyl styrene-based monomer or a maleimide-based monomer may be added. However, when a maleimide-based monomer was added, due to a reactivity ratio between the maleimide-based monomer, the vinyl cyanide-based monomer, and the vinyl aromatic monomer, a polymer having a non-uniform composition was produced.

To solve the above problem, it was proposed to change a polymerization method from suspension polymerization to continuous bulk polymerization or solution polymerization. However, since a reaction solution had high viscosity, the yield of a polymer was low, and since a separate process was required to recover unreacted monomers, production efficiency was significantly reduced.

To solve the above problem, it was proposed to produce a polymer by suspension polymerization while continuously adding a monomer mixture including a maleimide-based monomer, a vinyl cyanide-based monomer, and a vinyl aromatic monomer. However, the continuous addition of the monomer mixture caused a decrease in the concentration of monomers added to the reaction solution in an initial stage of polymerization. As a result, the vinyl cyanide-based monomer was excessively dissolved in water, resulting in a decrease in the amount of vinyl-cyanide-based monomer capable of participating in a reaction in an initial stage of polymerization, so a polymer having a non-uniform composition was produced.

RELATED-ART DOCUMENT

Patent Document (Patent Document 1) KR1995-0006130B1

DISCLOSURE

Technical Problem

The present invention is directed to providing a polymer production method capable of producing a polymer having a uniform composition and excellent heat resistance throughout polymerization.

Technical Solution (1) One aspect of the present invention provides a polymer production method including: batch-adding a reaction solution including a monomer mixture including a maleimide-based monomer, a vinyl aromatic monomer, and a vinyl cyanide-based monomer and an aqueous solvent to a reactor and initiating polymerization; and carrying out the polymerization while continuously adding the maleimide-based monomer and the aqueous solvent to the reactor, wherein the reaction solution satisfies the following Formula 1.

$44 \leq$ (Weight of the monomer mixture)/(Total weight of the monomer mixture and the aqueous solvent)$\times 100 \leq 56$ <Formula 1>

(2) Another aspect of the present invention provides the polymer production method of (1), wherein a value of the above the Formula 1 is in the range of 45 to 52.

(3) Still another aspect of the present invention provides the polymer production method of (1) or (2), wherein a time point at which the continuous addition of the maleimide-based monomer and the aqueous solvent is initiated is when a polymerization conversion rate is in the range of 0 to 10%.

(4) Yet another aspect of the present invention provides the polymer production method of any one of (1) to (3), wherein a time point at which the continuous addition of the maleimide-based monomer is terminated is when a polymerization conversion rate is in the range of 50 to 80%.

(5) Yet another aspect of the present invention provides the polymer production method of any one of (1) to (4), wherein a time point at which the continuous addition of the aqueous solvent is terminated is when a polymerization conversion rate is in the range of 60 to 80%.

(6) Yet another aspect of the present invention provides the polymer production method of any one of (1) to (5), wherein a weight ratio of the maleimide-based monomer added in the step of initiating polymerization and the maleimide-based monomer added in the step of carrying out the polymerization is in the range of 7.5:92.5 to 30:70.

(7) Yet another aspect of the present invention provides the polymer production method of any one of (1) to (6), wherein a weight ratio of the aqueous solvent added in the step of initiating polymerization and the aqueous solvent added in the step of carrying out the polymerization is in the range of 30:70 to 70:30.

(8) Yet another aspect of the present invention provides the polymer production method of any one of (1) to (7), wherein the amount of the monomer mixture is in the range of 40 to 80 wt % based on a total weight of the monomers added in the polymer production method.

(9) Yet another aspect of the present invention provides the polymer production method of any one of (1) to (8), wherein the monomer mixture includes: 8 to 20 wt % of the maleimide-based monomer; 60 to 75 wt % of the vinyl aromatic monomer; and 10 to 25 wt % of the vinyl cyanide-based monomer.

(10) Yet another aspect of the present invention provides the polymer production method of any one of (1) to (9), wherein the polymerization is suspension polymerization.

Advantageous Effects

According to a polymer production method of the present invention, a polymer having a uniform composition can be produced throughout polymerization.

BEST MODE

Hereinafter, the present invention will be described in more detail to help the understanding of the present invention.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technical spirit of the present invention.

The term "polymerization conversion rate" used in the present invention refers to a degree to which monomers are polymerized to form a polymer, and can be calculated by the following formula.

Polymerization conversion rate (%)=[(Total weight of monomers added until polymerization is terminated)−(Total weight of unreacted monomers at the time of measuring polymerization conversion rate)]/(Total weight of monomers added until polymerization is terminated)×100

The term "maleimide-based monomer" used in the present invention may be one or more selected from the group consisting of maleimide, N-methyl maleimide, N-ethyl maleimide, N-propyl maleimide, N-isopropyl maleimide, N-butyl maleimide, N-isobutyl maleimide, N-t-butyl maleimide, N-lauryl maleimide, N-cyclohexyl maleimide, N-phenyl maleimide, N-(4-chlorophenyl) maleimide, 2-methyl-N-phenyl maleimide, N-(4-bromophenyl) maleimide, N-(4-nitrophenyl) maleimide, N-(4-hydroxyphenyl) maleimide, N-(4-methoxyphenyl) maleimide, N-(4-carboxyphenyl) maleimide, and N-benzyl maleimide, of which N-phenyl maleimide is preferable. A unit derived from the maleimide-based monomer may be a maleimide-based monomer unit.

The term "vinyl cyanide-based monomer" used in the present invention may refer to one or more selected from the group consisting of acrylonitrile, methacrylonitrile, 2-ethylacrylonitrile, and 2-chloroacrylonitrile. The vinyl cyanide-based monomer is preferably acrylonitrile. A unit derived from the vinyl cyanide-based monomer may be a vinyl cyanide-based monomer unit.

The term "vinyl aromatic monomer" used in the present invention may refer to one or more selected from the group consisting of styrene, α-methylstyrene, p-methylstyrene, 2,4-dimethylstyrene, 4-fluorostyrene, 4-chlorostyrene, 2-chlorostyrene, 4-bromostyrene, and 2-bromostyrene. The vinyl aromatic monomer is preferably styrene. A unit derived from the vinyl aromatic monomer may be a vinyl aromatic monomer unit.

The term "aqueous solvent" used in the present invention may be ion-exchanged water or deionized water.

The term "suspending agent" used in the present invention may be one or more selected from the group consisting of water-soluble polyvinyl alcohol, partially saponified polyvinyl alcohol, polyacrylic acid, a polymer of vinyl acetate and maleic anhydride, hydroxypropyl methylcellulose, gelatin, calcium phosphate, tricalcium phosphate, hydroxyapatite, sorbitan monolaurate, sorbitan trioleate, polyoxyethylene, sodium lauryl sulfate, sodium dodecylbenzenesulfonate, and sodium dioctyl sulfosuccinate, of which tricalcium phosphate is preferable.

The term "initiator" used in the present invention may be one or more selected from the group consisting of 2,5-dimethyl-2,5-di(t-butylperoxy)hexane, di(t-butylperoxyisopropyl)benzene, t-butyl cumyl peroxide, di-(t-amyl)-peroxide, dicumyl peroxide, butyl 4,4-di(t-butylperoxy) valerate, t-butylperoxybenzoate, 2,2-di(t-butylperoxy) butane, t-amyl peroxy-benzoate, t-butylperoxy-acetate, t-butylperoxy-(2-ethylhexyl)carbonate, t-butylperoxy isopropyl carbonate, t-butylperoxy-3,5,5-trimethyl-hexanoate, 1,1-di(t-butylperoxy)cyclohexane, t-amyl peroxyacetate, t-amylperoxy-(2-ethylhexyl)carbonate, 1,1-di(t-butylperoxy)-3,5,5-trimethylcyclohexane, 1,1-di(t-amylperoxy)cyclohexane, t-butyl-monoperoxy-maleate, and 1,1'-azodi(hexahydrobenzonitrile), of which one or more selected from the group consisting of dicumyl peroxide, 1,1-di(t-butylperoxy)cyclohexane, and 1,1'-azobis(cyclohexanecarbonitrile) are preferable.

1. Polymer Production Method

According to one embodiment of the present invention, a polymer production method includes: 1) batch-adding a reaction solution including a monomer mixture including a maleimide-based monomer, a vinyl aromatic monomer, and a vinyl cyanide-based monomer and an aqueous solvent to a reactor and initiating polymerization; and 2) carrying out the polymerization while continuously adding the maleimide-based monomer and an aqueous solvent to the reactor, wherein the reaction solution satisfies the following Formula 1.

44≤(Weight of the monomer mixture)/(Total weight of the monomer mixture and the aqueous solvent)×100≤56  <Formula 1>

According to a technical aspect of the present invention, the concentration of a monomer mixture in a reaction solution added before the initiation of polymerization is limited to a specific range, and a maleimide-based monomer and an aqueous solvent are continuously added after polymerization is initiated.

Specifically, since the total amount of monomers and aqueous solvent added for polymerization is fixed, when a maleimide-based monomer is continuously added after polymerization is initiated, it is inevitable that the concentration of the monomer mixture in the reaction solution added before the initiation of polymerization is reduced. As a result, the vinyl cyanide-based monomer included in the reaction solution is excessively dissolved in the aqueous solvent, and since the amount of vinyl cyanide-based monomer capable of participating in polymerization is reduced, a polymer including a small amount of vinyl cyanide-based monomer units is produced in an initial stage of polymerization.

However, according to a technical aspect of the present invention, since an aqueous solvent as well as a maleimide-based monomer is continuously added after polymerization is initiated, the amount of aqueous solvent included in the reaction solution added before the initiation of polymerization is reduced, and thus the concentration of monomers can be increased. As a result, since the amount of vinyl cyanide-based monomer participating in polymerization increases, a polymer having a uniform composition and excellent heat resistance can be produced throughout the polymerization.

Hereinafter, a polymer production method according to one embodiment of the present invention will be described in detail.

1) Initiation of Polymerization

First, a reaction solution including a monomer mixture including a maleimide-based monomer, a vinyl aromatic monomer, and a vinyl cyanide-based monomer and an aqueous solvent is batch-added to a reactor, and polymerization is initiated.

In this case, the reaction solution satisfies a value of the Formula 1, and preferably, the value of the Formula 1 is in the range of 45 to 52. When the value of the Formula 1 is satisfied, since the concentration of the monomer mixture included in the reaction solution is appropriate, the amount of vinyl cyanide-based monomer capable of participating in polymerization in an initial stage of polymerization increases, and as a result, a polymer having a uniform composition and excellent heat resistance can be produced throughout the polymerization. In addition, the polymerization can be stably performed, and since the reaction solution can be smoothly mixed during the polymerization, layer separation of the reaction solution or suspension break does not occur.

On the other hand, when the value of the Formula 1 is less than the above-described range, since the concentration of the monomer mixture included in the reaction solution is reduced, the vinyl cyanide-based monomer is excessively dissolved in water. Therefore, the amount of vinyl cyanide-based monomer capable of participating in polymerization in an initial stage of polymerization is reduced, and a polymer having a uniform composition and excellent heat resistance cannot be produced throughout the polymerization. In addition, when the value of the Formula 1 exceeds the above-described range, since the viscosity of the reaction solution becomes excessively high, a polymer cannot be uniformly mixed. As a result, suspension break occurs, and polymerization inevitably stops.

The amount of the monomer mixture may be in the range of 40 to 80 wt % and preferably 60 to 75 wt % based on the total weight of the monomers added in the polymer production method. When the above range is satisfied, a polymerization rate can be easily controlled.

The monomer mixture may include 8 to 20 wt % of the maleimide-based monomer, 60 to 75 wt % of the vinyl aromatic monomer, and 10 to 25 wt % of the vinyl cyanide-based monomer. Preferably, the monomer mixture may include 11 to 18 wt % of the maleimide-based monomer, 63 to 72 wt % of the vinyl aromatic monomer, and 14 to 22 wt % of the vinyl cyanide-based monomer. When the above conditions are satisfied, a polymerization rate can be easily controlled, and the polymerization uniformity of a polymer can be improved.

The polymerization is preferably suspension polymerization which uses an aqueous solvent as a medium and thus allows easy reaction control and has high yield and a simple washing process.

The suspension polymerization may be initiated in the presence of an initiator and a suspending agent.

The initiator may be present in an amount of 0.001 to 1 part by weight and preferably 0.01 to 0.5 parts by weight based on 100 parts by weight of the sum of the monomers added in the polymer production method. When the above condition is satisfied, the polymerization conversion rate of a polymer can be increased, and a polymerization rate can be easily controlled.

The suspending agent may be present in an amount of 0.5 to 2 parts by weight and preferably 1 to 1.5 parts by weight based on 100 parts by weight of the sum of the monomers added in the polymer production method. When the above condition is satisfied, the average particle diameter of a polymer can be adjusted to a desired size, and dispersion stability can be improved.

2) Implementation of Polymerization

Subsequently, the polymerization is carried out while continuously adding each of the maleimide-based monomer and the aqueous solvent to the reactor.

When all of the maleimide-based monomer is batch-added before the initiation of polymerization, due to a reactivity ratio between the maleimide-based monomer, a vinyl aromatic monomer, and a vinyl cyanide-based monomer, the maleimide-based monomer and the vinyl aromatic monomer mainly react in an initial stage of polymerization, and the vinyl aromatic monomer, the vinyl cyanide-based monomer, and the vinyl cyanide-based monomer dissolved in the aqueous solvent react after all the maleimide-based monomer has been used, so it is difficult to produce a polymer having a uniform composition throughout the polymerization.

In addition, when only the maleimide-based monomer is continuously added without the aqueous solvent, the amount of monomer mixture in the reactor gradually increases as the continuous addition of the maleimide-based monomer proceeds. Therefore, the viscosity of the reaction solution becomes excessively high, and a polymer cannot be uniformly mixed. As a result, suspension break occurs, and polymerization inevitably stops.

However, when each of the maleimide-based monomer and the aqueous solvent is continuously added, even when a reactivity ratio between the maleimide-based monomer and a vinyl aromatic monomer is high, since the maleimide-based monomer is not sufficiently supplied in an initial stage of polymerization, a reaction with a vinyl cyanide-based monomer is inevitable from the initial stage of polymerization, and as a result, a polymer having a uniform composition can be produced throughout the polymerization.

Meanwhile, the weight ratio of the maleimide-based monomer added in the step of initiating polymerization and the maleimide-based monomer added in the step of carrying out the polymerization may be in the range of 7.5:92.5 to 30:70 and preferably 20:80 to 25:75. When the above condition is satisfied, a polymerization rate can be easily controlled, and a polymer having a uniform composition can be produced.

The weight ratio of the aqueous solvent added in the step of initiating polymerization and the aqueous solvent added in the step of carrying out the polymerization may be in the range of 30:70 to 70:30 and preferably 35:65 to 65:35. When the above condition is satisfied, a polymer uniformly including vinyl cyanide-based monomer units and having improved heat resistance can be produced.

A time point at which the continuous addition of the maleimide-based monomer and the aqueous solvent is initiated may be when a polymerization conversion rate is in the range of 0 to 10% and preferably 0 to 5%. When the above condition is satisfied, a polymer uniformly including vinyl cyanide-based monomer units and having improved heat resistance can be produced.

A time point at which the continuous addition of the maleimide-based monomer is terminated may be when a polymerization conversion rate is in the range of 50 to 80% and preferably 60 to 75%. When the above condition is satisfied, the amount of unreacted monomers can be reduced, and a polymer having a uniform composition can be produced.

A time point at which the continuous addition of the aqueous solvent is terminated may be when a polymerization conversion rate is in the range of 60 to 80% and preferably 60 to 75%. When the above condition is satisfied, since the viscosity of the reaction solution can be lowered, polymerization stability can be secured, and the amount of vinyl cyanide-based monomer dissolved in the aqueous solvent can be reduced.

In addition, the maleimide-based monomer may be continuously added for a time corresponding to 20 to 70% and preferably 28 to 70% of the total polymerization time. When the above condition is satisfied, a polymer having a uniform composition can be produced, and the amount of polymerization residue can be reduced.

In addition, the aqueous solvent may be continuously added for a time corresponding to 20 to 70% and preferably 28 to 70% of the total polymerization time. When the above condition is satisfied, since the solubility of the vinyl cyanide-based monomer in the aqueous solvent is lowered, a polymer having a uniform composition can be produced.

3) Termination of Polymerization

After step 2), the polymerization may be terminated when a polymerization conversion rate is 95% or more.

When the polymerization is terminated at the above time point, additional polymerization and aging processes may be performed after the continuous addition of the maleimide-based monomer is terminated. Accordingly, since the maleimide-based monomer continuously added at a relatively late time point can sufficiently participate in polymerization, the production of oligomers can be suppressed, and as a result, a polymer having a uniform composition can be produced throughout the polymerization.

Hereinafter, exemplary embodiments of the present invention will be described in detail so that those of ordinary skill in the art can easily carry out the present invention. However, the present invention is not limited to the exemplary embodiments described herein and may be implemented in various different forms.

Example 1

After batch-adding 48 parts by weight of styrene, 12 parts by weight of acrylonitrile, 10 parts by weight of N-phenyl maleimide, 56 parts by weight of ion-exchanged water, 0.02 parts by weight of 1,1-di(t-butylperoxy)cyclohexane, 0.02 parts by weight of dicumyl peroxide, and 1.3 parts by weight of tricalcium phosphate to a reactor, the stirring speed of the reactor was set at 500 rpm, and polymerization was initiated by increasing the temperature of the reactor to 90° C.

Subsequently, the polymerization was carried out while continuously adding 94 parts by weight of ion-exchanged water to the reactor at a constant rate from a time point at which a polymerization conversion rate of 5% was reached to a time point at which a polymerization conversion rate of 63% was reached. In addition, the polymerization was carried out while continuously adding 30 parts by weight of N-phenyl maleimide to the reactor at a constant rate from a time point at which a polymerization conversion rate of 5% was reached to a time point at which a polymerization conversion rate of 63% was reached. In this case, the continuous addition of each of the ion-exchanged water and the N-phenyl maleimide was performed for 150 minutes.

After the continuous addition of all the ion-exchanged water and N-phenyl maleimide was completed, polymerization was carried out for 90 minutes while maintaining the temperature of the reactor at 90° C., for 20 minutes while increasing the temperature of the reactor to 120° C., and then for 100 minutes while maintaining the temperature of the reactor at 120° C., and then was terminated.

After adding formic acid to the obtained polymerization slurry to adjust the acid value of the slurry to 2.5 and removing the dispersant, the resultant was washed, dehydrated, and dried, and thus a heat-resistant polymer in the form of beads was obtained.

Example 2

After batch-adding 48 parts by weight of styrene, 12 parts by weight of acrylonitrile, 10 parts by weight of N-phenyl maleimide, 64 parts by weight of ion-exchanged water, 0.02 parts by weight of 1,1-di(t-butylperoxy)cyclohexane, 0.02 parts by weight of dicumyl peroxide, and 1.3 parts by weight of tricalcium phosphate to a reactor, the stirring speed of the reactor was set at 500 rpm, and polymerization was initiated by increasing the temperature of the reactor to 90° C.

Subsequently, the polymerization was carried out while continuously adding 86 parts by weight of ion-exchanged water to the reactor at a constant rate from a time point at which a polymerization conversion rate of 5% was reached to a time point at which a polymerization conversion rate of 60% was reached. In addition, the polymerization was carried out while continuously adding 30 parts by weight of N-phenyl maleimide to the reactor at a constant rate from a time point at which a polymerization conversion rate of 5% was reached to a time point at which a polymerization conversion rate of 70% was reached. In this case, the continuous addition of the ion-exchanged water was performed for 100 minutes, and the continuous addition of the N-phenyl maleimide was performed for 150 minutes.

After the continuous addition of all the ion-exchanged water and N-phenyl maleimide was completed, polymerization was carried out for 90 minutes while maintaining the temperature of the reactor at 90° C., for 20 minutes while increasing the temperature of the reactor to 120° C., and then for 100 minutes while maintaining the temperature of the reactor at 120° C., and then was terminated.

After adding formic acid to the obtained polymerization slurry to adjust the acid value of the slurry to 2.5 and removing the dispersant, the resultant was washed, dehydrated, and dried, and thus a heat-resistant polymer in the form of beads was obtained.

Example 3

After batch-adding 48 parts by weight of styrene, 12 parts by weight of acrylonitrile, 10 parts by weight of N-phenyl maleimide, 86 parts by weight of ion-exchanged water, 0.02 parts by weight of 1,1-di(t-butylperoxy)cyclohexane, 0.02 parts by weight of dicumyl peroxide, and 1.3 parts by weight of tricalcium phosphate to a reactor, the stirring speed of the reactor was set at 500 rpm, and polymerization was initiated by increasing the temperature of the reactor to 90° C.

Subsequently, the polymerization was carried out while continuously adding 64 parts by weight of ion-exchanged water to the reactor at a constant rate from a time point at which a polymerization conversion rate of 5% was reached to a time point at which a polymerization conversion rate of 63% was reached. In addition, the polymerization was carried out while continuously adding 30 parts by weight of N-phenyl maleimide to the reactor at a constant rate from a time point at which a polymerization conversion rate of 5% was reached to a time point at which a polymerization conversion rate of 63% was reached. In this case, the continuous addition of each of the ion-exchanged water and the N-phenyl maleimide was performed for 150 minutes.

After the continuous addition of all the ion-exchanged water and N-phenyl maleimide was completed, polymerization was carried out for 90 minutes while maintaining the temperature of the reactor at 90° C., for 20 minutes while increasing the temperature of the reactor to 120° C., and then for 100 minutes while maintaining the temperature of the reactor at 120° C., and then was terminated.

After adding formic acid to the obtained polymerization slurry to adjust the acid value of the slurry to 2.5 and removing the dispersant, the resultant was washed, dehydrated, and dried, and thus a heat-resistant polymer in the form of beads was obtained.

Example 4

After batch-adding 48 parts by weight of styrene, 12 parts by weight of acrylonitrile, 10 parts by weight of N-phenyl maleimide, 86 parts by weight of ion-exchanged water, 0.02 parts by weight of 1,1-di(t-butylperoxy)cyclohexane, 0.02 parts by weight of dicumyl peroxide, and 1.3 parts by weight of tricalcium phosphate to a reactor, the stirring speed of the reactor was set at 500 rpm, and polymerization was initiated by increasing the temperature of the reactor to 90° C.

Subsequently, the polymerization was carried out while continuously adding 64 parts by weight of ion-exchanged water to the reactor at a constant rate from a time point at which a polymerization conversion rate of 5% was reached to a time point at which a polymerization conversion rate of 66% was reached. In addition, the polymerization was carried out while continuously adding 30 parts by weight of N-phenyl maleimide to the reactor at a constant rate from a time point at which a polymerization conversion rate of 5% was reached to a time point at which a polymerization conversion rate of 66% was reached. In this case, the continuous addition of each of the ion-exchanged water and the N-phenyl maleimide was performed for 180 minutes.

After the continuous addition of all the ion-exchanged water and N-phenyl maleimide was completed, polymerization was carried out for 60 minutes while maintaining the temperature of the reactor at 90° C., for 20 minutes while increasing the temperature of the reactor to 120° C., and then for 100 minutes while maintaining the temperature of the reactor at 120° C., and then was terminated.

After adding formic acid to the obtained polymerization slurry to adjust the acid value of the slurry to 2.5 and removing the dispersant, the resultant was washed, dehydrated, and dried, and thus a heat-resistant polymer in the form of beads was obtained.

Example 5

After batch-adding 48 parts by weight of styrene, 12 parts by weight of acrylonitrile, 10 parts by weight of N-phenyl maleimide, 86 parts by weight of ion-exchanged water, 0.02 parts by weight of 1,1-di(t-butylperoxy)cyclohexane, 0.02 parts by weight of dicumyl peroxide, and 1.3 parts by weight of tricalcium phosphate to a reactor, the stirring speed of the reactor was set at 500 rpm, and polymerization was initiated by increasing the temperature of the reactor to 90° C.

Subsequently, the polymerization was carried out while continuously adding 64 parts by weight of ion-exchanged water to the reactor at a constant rate from a time point at which a polymerization conversion rate of 5% was reached to a time point at which a polymerization conversion rate of 72% was reached. In addition, the polymerization was carried out while continuously adding 30 parts by weight of N-phenyl maleimide to the reactor at a constant rate from a time point at which a polymerization conversion rate of 5% was reached to a time point at which a polymerization conversion rate of 72% was reached. In this case, the continuous addition of each of the ion-exchanged water and the N-phenyl maleimide was performed for 240 minutes.

After the continuous addition of all the ion-exchanged water and N-phenyl maleimide was completed, polymerization was carried out for 20 minutes while increasing the temperature of the reactor to 120° C. and then for 100 minutes while maintaining the temperature of the reactor at 120° C., and then was terminated.

After adding formic acid to the obtained polymerization slurry to adjust the acid value of the slurry to 2.5 and removing the dispersant, the resultant was washed, dehydrated, and dried, and thus a heat-resistant polymer in the form of beads was obtained.

Comparative Example 1

After batch-adding 48 parts by weight of styrene, 12 parts by weight of acrylonitrile, 40 parts by weight of N-phenyl maleimide, 150 parts by weight of ion-exchanged water, 0.02 parts by weight of 1,1-di(t-butylperoxy)cyclohexane, 0.02 parts by weight of dicumyl peroxide, and 1.3 parts by weight of tricalcium phosphate to a reactor, the stirring speed of the reactor was set at 500 rpm, and polymerization was initiated by increasing the temperature of the reactor to 90° C. and carried out for 240 minutes. Subsequently, polymerization was carried out for 20 minutes while increasing the temperature of the reactor to 120° C. and then for 100 minutes at 120° C., and then was terminated. After adding formic acid to the obtained polymerization slurry to adjust the acid value of the slurry to 2.5 and removing the dispersant, the resultant was washed, dehydrated, and dried, and thus a heat-resistant polymer in the form of beads was obtained.

Comparative Example 2

After batch-adding 150 parts by weight of ion-exchanged water and 1.3 parts by weight of tricalcium phosphate to a reactor, the stirring speed of the reactor was set at 500 rpm, and the temperature of the reactor was increased to 90° C. Polymerization was carried out while adding 48 parts by weight of styrene, 12 parts by weight of acrylonitrile, 40 parts by weight of N-phenyl maleimide, 0.02 parts by weight of 1,1-di(t-butylperoxy)cyclohexane, and 0.02 parts by weight of dicumyl peroxide to the reactor for 60 minutes at a constant rate. In this case, the continuous addition was terminated when a polymerization conversion rate was 45%.

In addition, polymerization was carried out for 180 minutes while maintaining the temperature of the reactor at 90° C. Subsequently, polymerization was carried out for 20 minutes while increasing the temperature of the reactor to 120° C. and then for 100 minutes at 120° C., and then was terminated. After adding formic acid to the obtained polymerization slurry to adjust the acid value of the slurry to 2.5 and removing the dispersant, the resultant was washed, dehydrated, and dried, and thus a heat-resistant polymer in the form of beads was obtained.

Comparative Example 3

After batch-adding 48 parts by weight of styrene, 12 parts by weight of acrylonitrile, 10 parts by weight of N-phenyl maleimide, 150 parts by weight of ion-exchanged water, 0.02 parts by weight of 1,1-di(t-butylperoxy)cyclohexane, 0.02 parts by weight of dicumyl peroxide, and 1.3 parts by weight of tricalcium phosphate to a reactor, the stirring speed of the reactor was set at 500 rpm, and polymerization was initiated by increasing the temperature of the reactor to 90° C.

Subsequently, the polymerization was carried out while continuously adding 30 parts by weight of N-phenyl maleimide to the reactor at a constant rate from a time point at which a polymerization conversion rate of 5% was reached to a time point at which a polymerization conversion rate of 60% was reached. In this case, the continuous addition of the N-phenyl maleimide was performed for 150 minutes.

After the continuous addition of all the N-phenyl maleimide was completed, polymerization was carried out for 90 minutes while maintaining the temperature of the reactor at 90° C. and then for 100 minutes while maintaining the temperature of the reactor at 120° C., and then was terminated.

After adding formic acid to the obtained polymerization slurry to adjust the acid value of the slurry to 2.5 and removing the dispersant, the resultant was washed, dehydrated, and dried, and thus a heat-resistant polymer in the form of beads was obtained.

Comparative Example 4

After batch-adding 48 parts by weight of styrene, 12 parts by weight of acrylonitrile, 10 parts by weight of N-phenyl maleimide, 96 parts by weight of ion-exchanged water, 0.02 parts by weight of 1,1-di(t-butylperoxy)cyclohexane, 0.02 parts by weight of dicumyl peroxide, and 1.3 parts by weight of tricalcium phosphate to a reactor, the stirring speed of the reactor was set at 500 rpm, and polymerization was initiated by increasing the temperature of the reactor to 90° C.

Subsequently, the polymerization was carried out while continuously adding 54 parts by weight of ion-exchanged water to the reactor at a constant rate from a time point at which a polymerization conversion rate of 5% was reached to a time point at which a polymerization conversion rate of 72% was reached. In addition, the polymerization was carried out while continuously adding 30 parts by weight of N-phenyl maleimide to the reactor at a constant rate from a time point at which a polymerization conversion rate of 5% was reached to a time point at which a polymerization conversion rate of 72% was reached. In this case, the continuous addition of each of the ion-exchanged water and the N-phenyl maleimide was performed for 240 minutes.

After the continuous addition of all the ion-exchanged water and N-phenyl maleimide was completed, polymerization was carried out for 20 minutes while increasing the temperature of the reactor to 120° C. and then for 100 minutes while maintaining the temperature of the reactor at 120° C., and then was terminated.

After adding formic acid to the obtained polymerization slurry to adjust the acid value of the slurry to 2.5 and removing the dispersant, the resultant was washed, dehydrated, and dried, and thus a heat-resistant polymer in the form of beads was obtained.

Comparative Example 5

After batch-adding 48 parts by weight of styrene, 12 parts by weight of acrylonitrile, 10 parts by weight of N-phenyl maleimide, 50 parts by weight of ion-exchanged water, 0.02 parts by weight of 1,1-di(t-butylperoxy)cyclohexane, 0.02 parts by weight of dicumyl peroxide, and 1.3 parts by weight of tricalcium phosphate to a reactor, the stirring speed of the reactor was set at 500 rpm, and polymerization was initiated by increasing the temperature of the reactor to 90° C.

Subsequently, the polymerization was carried out while continuously adding 100 parts by weight of ion-exchanged water and 30 parts by weight of N-phenyl maleimide to the reactor at a constant rate from a time point at which a polymerization conversion rate of 5% was reached. However, when 60 minutes had elapsed from the start of polymerization, the viscosity of the reaction solution became excessively high and polymerization stability was reduced, so polymerization was stopped.

Comparative Example 6

After batch-adding 48 parts by weight of styrene, 12 parts by weight of acrylonitrile, 10 parts by weight of N-phenyl maleimide, 56 parts by weight of ion-exchanged water, 0.02 parts by weight of 1,1-di(t-butylperoxy)cyclohexane, 0.02 parts by weight of dicumyl peroxide, and 1.3 parts by weight of tricalcium phosphate to a reactor, the stirring speed of the reactor was set at 500 rpm, and polymerization was initiated by increasing the temperature of the reactor to 90° C.

Subsequently, polymerization was carried out while continuously adding 30 parts by weight of N-phenyl maleimide to the reactor at a constant rate from a time point at which a polymerization conversion rate of 5% was reached. However, when 30 minutes had elapsed from the start of polymerization, the viscosity of the reaction solution became excessively high and polymerization stability was reduced, so polymerization was stopped.

EXPERIMENTAL EXAMPLES

Properties of polymers produced in Examples and Comparative Examples were evaluated by the methods described below, and the results are shown in Table 1 and Table 2 below.

(1) Difference in the amount of acrylonitrile monomer units: The amounts of acrylonitrile monomer units included in final polymer products were measured by Fourier transform infrared spectroscopy. The weights of acrylonitrile monomer units included in 11 intermediate polymer products obtained within polymerization conversion rate ranges shown in Table 1 and Table 2 were measured by Fourier transform infrared spectroscopy, and the highest values among them were taken as the weights of the acrylonitrile monomer units included in the intermediate polymer products. Subsequently, the weight differences of the acrylonitrile monomer units included in the final polymer products and their intermediate polymer products were calculated, and the results are shown in Table 1 and Table 2 below.

(2) Standard deviation of acrylonitrile monomer units: The amounts (wt %) of acrylonitrile monomer units included in polymers obtained when the polymerization conversion rates were 5%, 15%, 30%, 40%, 50%, 55%, 60%, 65%, 72%, 82%, and 95% were measured by Fourier transform infrared spectroscopy, and their standard deviation was calculated.

(3) Glass transition temperature (° C.): The glass transition temperatures of 11 intermediate polymer products obtained within the polymerization conversion rate ranges shown in Table 1 and Table 2 were measured with a differential scanning calorimeter (Q20 manufactured by TA Instruments), and the highest values among them are shown in Table 1 and Table 2 below.

(4) Standard deviation of glass transition temperature: The glass transition temperatures of polymers obtained when the polymerization conversion rates were 5%, 15%, 30%, 40%, 50%, 55%, 60%, 65%, 72%, 82%, and 95% were measured with a differential scanning calorimeter (Q20 manufactured by TA Instruments), and their standard deviation was calculated.

TABLE 1

| Classification | | | Example 1 | Example 2 | Example 3 | Example 4 | Example 5 |
|---|---|---|---|---|---|---|---|
| | Value of Formula 1 | | Approx. 56 | Approx. 52 | Approx. 45 | Approx. 45 | Approx. 45 |
| Ion-exchanged water | Start time of continuous addition (polymerization conversion rate, %) | | 5 | 5 | 5 | 5 | 5 |
| | End time of continuous addition (polymerization conversion rate, %) | | 63 | 60 | 63 | 66 | 72 |
| N-phenyl maleimide | Start time of continuous addition (polymerization conversion rate, %) | | 5 | 5 | 5 | 5 | 5 |
| | End time of continuous addition (polymerization conversion rate, %) | | 63 | 70 | 63 | 66 | 72 |
| | Amount of monomer mixture after end of continuous addition (wt %) | | 40 | 40 | 40 | 40 | 40 |
| Amount of acrylonitrile monomer units (wt %) | Polymerization conversion rate | 0% or more and 10% or less | 5.9 | 6.3 | 6.1 | 5.3 | 5.8 |
| | | More than 10% and 30% or less | 5.7 | 6.0 | 5.8 | 5.4 | 5.5 |
| | | More than 30% and 50% or less | 5.6 | 5.9 | 5.4 | 5.1 | 5.1 |
| | | More than 50% and 70% or less | 4.9 | 6.0 | 5.1 | 4.7 | 5.0 |
| | | More than 70% and 90% or less | 5.0 | 7.2 | 7.4 | 4.7 | 7.4 |
| | | More than 90% and 95% or less | 8.4 | 8.0 | 8.3 | 8.4 | 8.1 |
| Standard deviation of amount of acrylonitrile monomer units | | | 1.17 | 0.78 | 1.14 | 1.28 | 1.18 |
| Glass transition temperature (° C.) | Polymerization conversion rate | 0% or more and 10% or less | 197.0 | 197.0 | 198.1 | 196.8 | 197.9 |
| | | More than 10% and 30% or less | 195.5 | 193.3 | 196.4 | 195.6 | 195.8 |
| | | More than 30% and 50% or less | 195.3 | 192.4 | 196.1 | 196.7 | 195.4 |
| | | More than 50% and 70% or less | 194.4 | 191.4 | 195.5 | 198.7 | 195.4 |
| | | More than 70% and 90% or less | 196.0 | 188.2 | 195.4 | 199 | 188 |
| | | More than 90% and 95% or less | 183.1 | 187.3 | 184.8 | 182.2 | 184.3 |
| Standard deviation of glass transition temperature | | | 4.74 | 3.23 | 4.38 | 5.77 | 4.90 |

TABLE 2

| Classification | | | Comparative Example 1 | Comparative Example 2 | Comparative Example 3 | Comparative Example 4 | Comparative Example 5 | Comparative Example 6 |
|---|---|---|---|---|---|---|---|---|
| | Value of Formula 1 | | 40 | 0 | Approx. 32 | Approx. 42 | Approx. 58 | Approx. 56 |
| Ion-exchanged water | Start time of continuous addition (polymerization conversion rate, %) | | — | — | — | 5 | 5 | — |
| | End time of continuous addition (polymerization conversion rate, %) | | — | — | — | 72 | — | — |
| N-phenyl maleimide | Start time of continuous addition (polymerization conversion rate, %) | | — | 0 | 5 | 5 | 5 | 5 |
| | End time of continuous addition (polymerization conversion rate, %) | | — | 45 | 60 | 72 | — | 63 |
| | Amount of monomer mixture after end of continuous addition (wt %) | | 40 | 40 | 40 | 40 | 40 | 64 |
| Amount of acrylonitrile monomer units (wt %) | Polymerization conversion rate | 0% or more and 10% or less | — | — | 2.1 | 5.0 | — | — |
| | | More than 10% and 30% or less | 2.3 | 3.5 | 2.4 | 4.5 | — | — |
| | | More than 30% and 50% or less | 3.7 | 4 | 2.8 | 4.4 | — | — |
| | | More than 50% and 70% or less | 5.9 | 6.3 | 3.5 | 4.2 | — | — |
| | | More than 70% and 90% or less | 10.2 | 8 | 5.9 | 7.1 | — | — |
| | | More than 90% and 95% or less | 10.5 | 9.1 | 9.5 | 7.9 | — | — |
| Standard deviation of amount of acrylonitrile monomer units | | | 3.33 | 2.18 | 2.61 | 1.44 | — | — |

TABLE 2-continued

| Classification | | | Comparative Example 1 | Comparative Example 2 | Comparative Example 3 | Comparative Example 4 | Comparative Example 5 | Comparative Example 6 |
|---|---|---|---|---|---|---|---|---|
| Glass transition temperature (° C.) | Polymerization conversion rate | 0% or more and 10% or less | — | — | 201.7 | 199.9 | — | — |
| | | More than 10% and 30% or less | 201.5 | 208 | 198.8 | 197.8 | — | — |
| | | More than 30% and 50% or less | 192.3 | 203.5 | 196.4 | 197.7 | — | — |
| | | More than 50% and 70% or less | 185.9 | 186.6 | 196.5 | 195.9 | — | — |
| | | More than 70% and 90% or less | 158.8 | 182.6 | 190.1 | 193.3 | — | — |
| | | More than 90% and 95% or less | 157.1 | 173.7 | 179.2 | 181.2 | — | — |
| Standard deviation of glass transition temperature | | | 17.99 | 12.92 | 7.40 | 6.20 | — | — |

Referring to Table 1 and Table 2, in the case of Examples 1 to 5 in which the values of the Formula 1 were between about 45 and about 56 and ion-exchanged water and N-phenyl maleimide were continuously added after polymerization was initiated, since the standard deviations of the amounts of acrylonitrile monomer units in the final products and intermediate products and the standard deviations of glass transition temperatures are small, it can be seen that polymers having a uniform composition were produced throughout the polymerization. However, in the case of Comparative Example 1 in which ion-exchanged water and N-phenyl maleimide were not continuously added, since the standard deviation of the amount of acrylonitrile monomer units in the final product and intermediate products and the standard deviation of glass transition temperature are significantly larger than those of Examples 1 to 5, it can be seen that a polymer having a non-uniform composition was produced throughout polymerization.

In addition, in the case of Comparative Example 2 in which a monomer mixture was not added before the initiation of polymerization and polymerization was carried out while continuously adding the monomer mixture from the initiation of polymerization, since the standard deviation of the amount of acrylonitrile monomer units in the final product and intermediate products and the standard deviation of glass transition temperature are significantly larger than those of Examples 1 to 5, it can be seen that a polymer having a non-uniform composition was produced throughout the polymerization.

In addition, in the case of Comparative Example 3 in which the value of the Formula 1 was about 32 and ion-exchanged water was not continuously added, since the standard deviation of the amount of acrylonitrile monomer units in the final product and intermediate products and the standard deviation of glass transition temperature are significantly larger than those of Examples 1 to 5, it can be seen that a polymer having a non-uniform composition was produced throughout polymerization.

In addition, in the case of Comparative Example 4 in which the value of the Formula 1 was about 42 and ion-exchanged water and N-phenyl maleimide were continuously added after polymerization was initiated, since the value of the Formula 1 was excessively low, the amount of acrylonitrile participating in polymerization in an initial stage of polymerization was smaller than that of Examples, so a polymer having a uniform composition could not be produced throughout the polymerization.

In addition, in the case of Comparative Example 5 in which the value of the Formula 1 was about 58 and ion-exchanged water and N-phenyl maleimide were continuously added after polymerization was initiated, since the value of the Formula 1 was excessively high, the viscosity of the reaction solution became excessively high during polymerization, and the polymerization had to be stopped because polymerization stability was reduced, so a polymer could not be obtained.

In addition, in the case of Comparative Example 6 in which the value of the Formula 1 was about 56 but an aqueous solvent was not continuously added, the value of the Formula 1 gradually increased as N-phenyl maleimide was continuously added. Therefore, the viscosity of the reaction solution became excessively high during polymerization, and the polymerization had to be stopped because polymerization stability was reduced, so a polymer could not be obtained.

The invention claimed is:

1. A polymer production method comprising:
   batch-adding a reaction solution including a monomer mixture including a maleimide-based monomer, a vinyl aromatic monomer, and a vinyl cyanide-based monomer and an aqueous solvent to a reactor and initiating polymerization; and
   carrying out the polymerization while continuously adding the maleimide-based monomer and the aqueous solvent to the reactor,
   wherein the reaction solution satisfies the following Formula 1:

$$44 \leq (\text{Weight of the monomer mixture})/(\text{Total weight of the monomer mixture and the aqueous solvent}) \times 100 \leq 56. \quad <\text{Formula 1}>$$

2. The polymer production method of claim 1, wherein a value of the Formula 1 is in a range of 45 to 52.

3. The polymer production method of claim 1, wherein a time point at which the continuous addition of each of the maleimide-based monomer and the aqueous solvent is initiated is when a polymerization conversion rate is in a range of 0% to 10%.

4. The polymer production method of claim 1, wherein a time point at which the continuous addition of the maleimide-based monomer is terminated is when a polymerization conversion rate is in a range of 50% to 80%.

5. The polymer production method of claim 1, wherein a time point at which the continuous addition of the aqueous solvent is terminated is when a polymerization conversion rate is in a range of 60% to 80%.

6. The polymer production method of claim 1, wherein a weight ratio of the maleimide-based monomer added in the batch-addition and the maleimide-based monomer added in the carrying out of the polymerization is in a range of 7.5:92.5 to 30:70.

7. The polymer production method of claim 1, wherein a weight ratio of the aqueous solvent added in the batch-addition and the aqueous solvent added in the carrying out of the polymerization is in a range of 30:70 to 70:30.

8. The polymer production method of claim 1, wherein an amount of the monomer mixture is in a range of 40 wt % to 80 wt % based on a total weight of the monomers added in the polymer production method.

9. The polymer production method of claim 1, wherein the monomer mixture includes:
   8 wt % to 20 wt % of the maleimide-based monomer;
   60 wt % to 75 wt % of the vinyl aromatic monomer; and
   10 wt % to 25 wt % of the vinyl cyanide-based monomer.

10. The polymer production method of claim 1, wherein the polymerization is suspension polymerization.

\* \* \* \* \*